Figure 1:
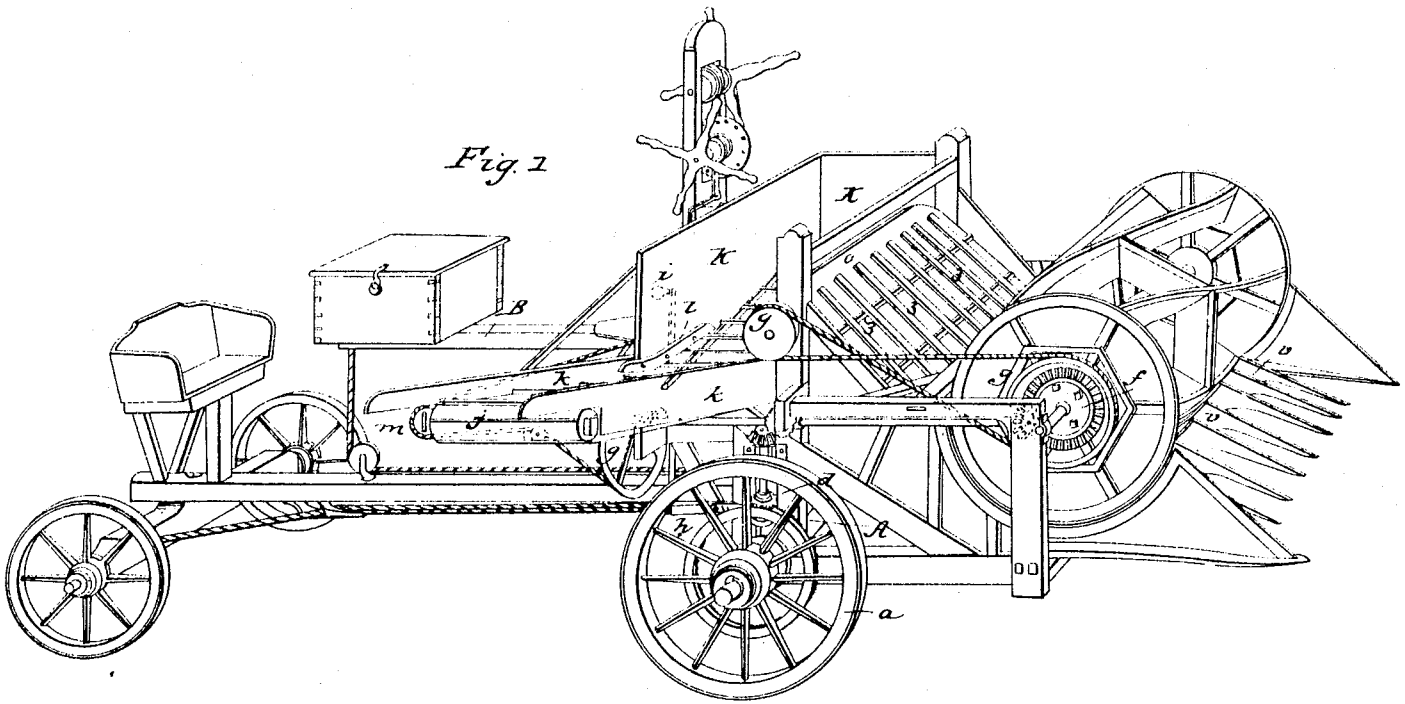

BEST AVAILABLE COPY

2 Sheets—Sheet 1.

G. ESTERLY.

Harvester.

No. 155. A. I. Patented Nov. 25, 1856.

INVENTOR
Geo. Esterly.

N. PETERS, Photo-Lithographer, Washington, D. C.

BEST AVAILABLE COPY
G. ESTERLY.
2 Sheets—Sheet 2.
Harvester.
No. 155.
A. I. Patented Nov. 25, 1856.
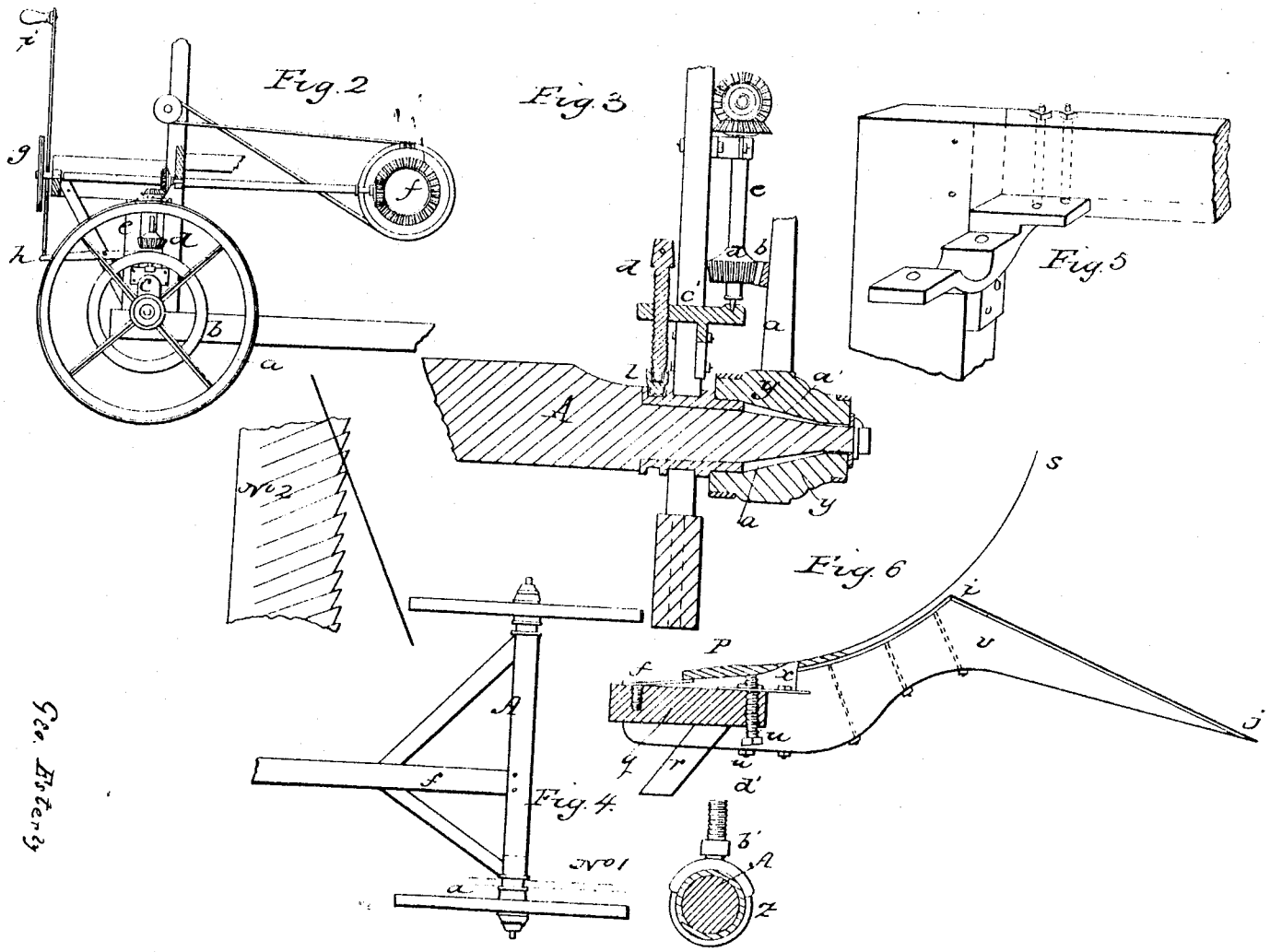
Y. PETERS, Photo-Lithographer, Washington, D. C.